United States Patent [19]

Kanamoto

[11] Patent Number: 4,856,016

[45] Date of Patent: Aug. 8, 1989

[54] GAS LASER TUBE HAVING A SLOTTED ANODE

[75] Inventor: Takashi Kanamoto, Tokyo, Japan

[73] Assignee: NEC Corporation, Japan

[21] Appl. No.: 80,326

[22] Filed: Jul. 31, 1987

[30] Foreign Application Priority Data

Jul. 31, 1986 [JP] Japan .................................. 61-117776

[51] Int. Cl.$^4$ ............................................. H01S 3/097
[52] U.S. Cl. ........................................ 372/87; 372/62
[58] Field of Search ......................... 372/61, 62, 87, 88

[56] References Cited

U.S. PATENT DOCUMENTS 4,001,720 1/1977 Carbonetta, Jr. ...................... 372/62

OTHER PUBLICATIONS

Schuebel, "Laser Action in Al II and He I in a Slot Cathode Discharge", May 15, 1977, Applied Physics Letters, vol. 30, No. 10, pp. 516-519.

Primary Examiner—Frank Gonzalez
Assistant Examiner—B. R. R. Holloway
Attorney, Agent, or Firm—Laff, Whitesel, Conte & Saret

[57] ABSTRACT

A gas laser tube comprises an elongated insulative envelope for containing a laser active medium therein, and an anode electrode and a cathode electrode provided in the elongated envelope for an electric discharge therebetween within the envelope. The anode electrode is formed of a metallic disc having an outer surface in ceaseless contact with an inner surface of the envelope. Further, the metallic disc having at least one slot formed in the outer surface thereof to extend between a pair of opposite end surfaces of the metallic disc.

6 Claims, 2 Drawing Sheets

GAS LASER TUBE HAVING A SLOTTED ANODE

BACKGROUND OF THE INVENTION

1. Field of the Invention

The present invention relates to a gas laser tube, and more specifically to a structure of an anode which is located within an elongated envelope defining a gas filled space and which is in contact with the inner wall surface of the envelope at least when the laser is in an operating condition.

2. Description of Related Art

Gas lasers are composed of an insulative envelope filling therein a gaseous active medium such as argon and krypton. For example, with electric discharge in the envelope, the gaseous atoms are activated from a basic state to excited states so that a so-called laser oscillation is caused.

In order to cause transition from the basic state to the excited state, a very large energy is required. For example, in a so-called ion laser, it is necessary to supply a large electric current at the degree of several ten amperes so as to generate a sufficient discharge in the laser tube.

However, oscillation efficiency of the gas laser is very low. Namely, most of applied electric energy is converted to heat which is then exhausted in the form of heat to the external. Therefore, the gas laser will generate a very large mount of heat. For example, the amount of heat generated in the ion laser will reach several kilowatts to several ten kilowatts.

The large amount of heat will cause a deformation of a laser tube including in the insulative envelope, so that an optical quality of the generated laser beam is greatly deteriorated. In addition, if the deformation of the laser tube becomes remarkable, the laser tube itself will often be broken.

In the prior art, therefore, it has been an ordinary practice to provide a cooling mechanism to the laser tube in accordance with a heat resistance of the laser tube itself.

In such gas lasers provided with the cooling mechanism, the envelope and a laser capillary or discharge path member have been formed of ceramic materials having good heat resistance and high heat conductivity. Further, a cooling water is supplied to the outer surface of the ceramic envelope so as to sufficiently forcedly cool a portion of the envelope where an anode is located and which generates a large heat.

However, the conventional gas laser has another disadvantage caused by the force cooling. In the gas laser tube, an anode disc member is located within the tubular ceramic envelope in contact with the inner surface of the envelope. On the other hand, the anode is ordinarily made of metal having a coefficient of thermal expansion higher than that of the ceramic envelope.

Therefore, even if the laser envelope is in a forcedly cooled condition, since the temperature of the anode itself will be increased by operation of the laser, a stress will generate to act on the envelope in outwardly radial directions apply pressure radially against the envelope. The higher the temperature is, the larger this force becomes, Accordingly, if the temperature elevates too high, the ceramic envelope would be broken by the force caused by the thermal expansion

SUMMARY OF THE INVENTION

Accordingly, it is an object of the present invention to provide a gas laser tube free from the above mentioned drawback.

Another object of the present invention is to provide a gas laser tube having an anode member which will never damage or destroy a forcedly cooled insulative envelope even if the anode is thermally expanded.

Still another object of the present invention is to provide an anode member located in a forcedly cooled insulative envelope of a gas laser and having an outer surface in endless contact with an inner surface of the envelope without causing an excessive stress to act on the envelope, even if the anode is heated to a high temperature.

The above and other objects of the present invention are achieved in accordance with the present invention by a gas laser tube comprising an elongated insulative envelope for containing a laser active medium therein, and an anode electrode and a cathode electrode provided in the elongated envelope for an electric discharge therebetween within the envelope, wherein the improvement is that the anode electrode is formed of a metallic disc having an outer surface in endless contact with an inner surface of the envelope, the metallic disc having at least one slot formed in the outer surface thereof to extend between a pair of opposite end surfaces of the metallic disc.

With the above arrangement, when the anode is heated, the expansion of the anode is restricted in an outwardly radial direction by the envelope, but is allowed in a peripheral direction by the slot. Namely, the thermal expansion of the anode is absorbed by the narrowing-down of the slot, and therefore, an excessive stress will not act on the envelope in an outwardly radial direction.

In addition, since the anode is endlessly in contact with the envelope, a substantial temperature difference will not occur between the anode and the envelope even if the temperature of the anode is elevated by an electric discharge within the envelope. Therefore, a thermal shock to the envelope, which would occur when there is a substantial temperature difference between the anode and the envelope, will be suppressed almost, so that the envelope is protected from damage and break which would be caused by the thermal shock.

Therefore, the envelope is prevented from being broken by the temperature elevation of the anode. Furthermore, since the anode is endlessly in contact with the forcedly cooled envelope, the cooling efficiency of the anode is improved.

According to another aspect of the present invention there is provided a gas laser tube comprising an elongated insulative envelope for containing a gaseous laser active medium therein, the envelope including a plurality of ceramic disc members and a plurality of ceramic cylindrical members which are alternately and coaxially arranged along a capillary axis of the gas laser tube, each of the disk members having a central through hole and a plurality of second through holes formed at the same angular intervals to surround the central hole, the disc members and the cylindrical member being airtightly secured to each other in such a manner that the central through holes of the respective disc members are aligned to form a straight discharge path called a laser capillary, and each second hole 16 of each disc member functions as a gas return path, and the envelope further including a pair of ceramic end caps respectively fixed to opposite ends of the the seriessecured disc members and cylindrical members, each of the end caps having a Brewster plate located at its outer end; and an anode electode and a cathode electrode provided in the corresponding end caps for an electric dischrage therebetween within the envelope, wherein the improvement is that the anode electrode is formed of a metallic disc having an outer surface in endless contact with an inner surface of the corresponding end cap, the metallic disc having at least one slot formed in the outer surface thereof to extend between a pair of opposite end surfaces of the metallic disc.

Preferably, each of the end caps includes a cylindrical end member secured at its one end to the adjacent disc member, an end plate secured to the other end of each cylindrical end member, and a tubular member extending outwardly from a center portion of each end plate, and the Brewster plate is secured to a trip end of each tubular member at an angle inclined to the laser capillary axis.

In one embodiment, the anode electrode in the form of a metallic disc has a plurality of slots formed in the outer surface thereof at equal angular intervals. Further, each of the slots is preferably inclined to a radius of the anode disc member.

In another embodiment, the anode electrode in the form of a metallic disc has only one slot formed in the outer surface thereof, the slot having a depth and width sufficient to absorb a thermal expansion of the anode electrode restricted by the envelope.

The above and other objects, features and advantages of the present invention will be apparent from the following description of preferred embodiments of the invention with reference to the accompanying drawings.

DESCRIPTION OF THE PREFERRED EMBODIMENTS

Figure 1:
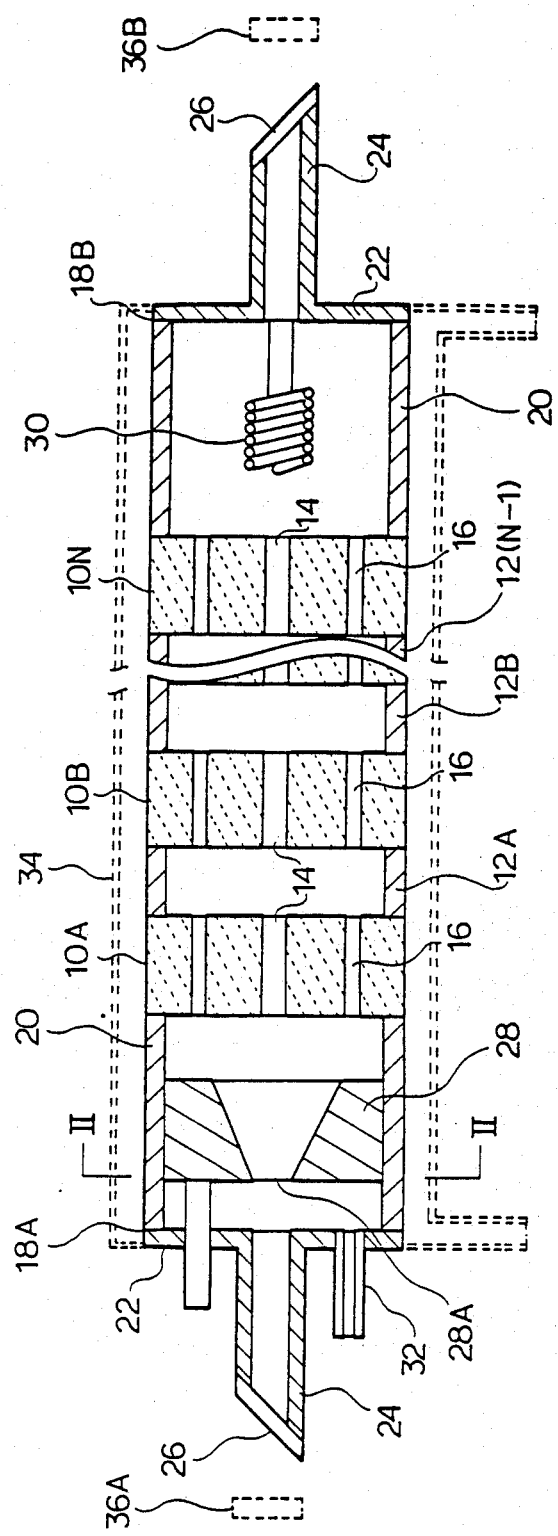
FIG. 1 is a longitudinal sectional view of one embodiment of the external mirror type gas laser tube in accordance with the present invention.

Referring to FIG. 1, there is shown one embodiment of the external mirror type gas laser tube in accordance with the present invention, which comprises a plurality of ceramic disc members 10 (10A, 10B, ... 10N) and a plurality of ceramic cylindrical members 12 (12A, 12B, ... 12(N-1)) which are alternately and coaxially arranged along a capillary axis of the gas laser tube. These members 10 and 12 have the same outer diameter, and each of the disc members 10 has a central through hole 14 and a plurality of second through holes 16 formed at the same angular intervals to surround the central hole 14. These second holes 16 are positioned inside the cylindrical member 12. The disc members 10 and the cylindrical member 12 are air-tightly secured to each other in such a manner that the central through holes 14 of the respective disc members 10 are aligned to form a straight discharge path called a "laser capillary", and each second hole 16 of each disc member functions as a gas return path.

To opposite ends of the series-secured disc members 10 and cylindrical members 12 as mentioned above, a pair of ceramic end caps 18A and 18B are fixed, respectively, for example by glass solder. Each of the end caps 18A and 18B includes a cylindrical end member 20 secured at its one end to the adjacent disc member 10A or 10N. An end plate 22 is secured to the other end of each cylinder end member 20. A tubular member 24 extends outwardly from a center portion of each end plate 22. Further, a Brewster plate 26 is secured to a tip end of each tubular member 24 at an angle inclined to the laser capillary axis. The Brewster plate 26 is made of for example silica glass.

Thus, a vacuum envelope is formed by the disc member 10, the cylindrical members 12 and the end caps 18. An anode electrode 28 is located in space defined by the end cap 18A and the disc member 10A coupled thereto, and a cathode electrode 30 is located in a space defined by the end cap 18B and the disc member 10N coupled thereto. The anode electrode 28 is formed of a metal disc which has a central through hole 28A in alignment with the central holes 14 of the disc members 10. In addition, the through hole 28A is in the form of a circular cone flared toward the adjacent disc member 10A. On the other hand, the cathode electrode 30 is in the form of a spiral coil having a center core space in alignment with the central holes 14 of the disc member 10. Furthermore, the end cap 18A accommodating therein the anode electrode 28 has a metal tube 32 for exhausting gas from the envelope and charging a laser active gas to the envelope.

When the laser tube constructed as mentioned above is put in a usuable condition, the cylindrical envelope is covered by a water jacket 34 shown in dotted lines in FIG. 1, so that the cylindrical envelope is cooled by a water circulated through the water jacket 34. In addition, a pair of mirrors 36A and 36B are located in alignment with the capillary axis to put the laser tube therebetween.

Figure 2:
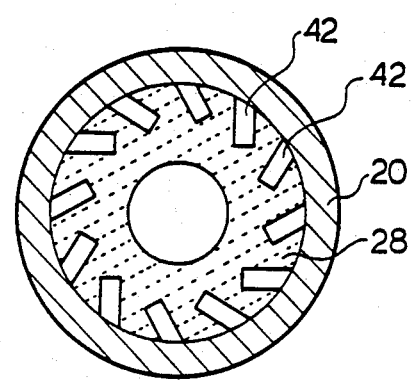
FIG. 2 is a sectional view taken along the line II—II in FIG. 1.

As seen from FIG. 1, and in accordance with the present invention, the anode electrode 28 has an outer diameter equal to the inner diameter of the cylindrical end member 20 of the end 18A so that the anode electrode 28 is in close contact with the cylindrical end member 20 at ordinary temperature. Further, the anode electrode 28 has a plurality of slots 42 formed in the outer surface thereof in contact with the inner surface of the cylindrical end member 20. The slots 42 are arranged at equal angular intervals and extend from one end surface of the anode electrode 28 to the other end surface. As seen from FIG. 2, each of the slots 42 is inclined to a radius of the disc-like anode electrode 28.

With the arrangement, the anode electrode 28 is maintained in contact with the cylndrical end member 20 from ordinary temperature to a high temperature. Therefore, when the temperature of the anode electrode 28 is elevated by electric discharge, the anode electrode 28 is thermally expanded maintaining a close contact between the anode electrode 28 and the cylindrical end member 20 of the envelope. In other words, the temperature of the anode electrode 28 is elevated without a substantial difference in temperature between the anode electrode 28 and the cylindrical end member 20. Thus, there will not almost occur a thermal shock to the envelope (particularly to the cylindrical end member 20 of the end cap 18A) which would be caused when a temperature difference exists between the anode electrode 28 and the cylindrical end member 20.

Further, the thermal expansion of the anode electrode 28 is restricted by the cylindrical end member 20 in endless contact with the anode electrode 28, but is allowed by the slots 42. In other words, a stress caused by the temperature elevation in accordance with a difference in coefficient of thermal expansion between the anode electrode (metal) and the cylndrical end member (ceramics) is absorbed by deformation (narrowing-down) of the slots 42 formed by the periphery of the anode electrode 28 in contact with the cylindrical end member 20. Thus, the end member 20 is protected from being broken by the therml expansion of the anode electrode.

Figure 3:
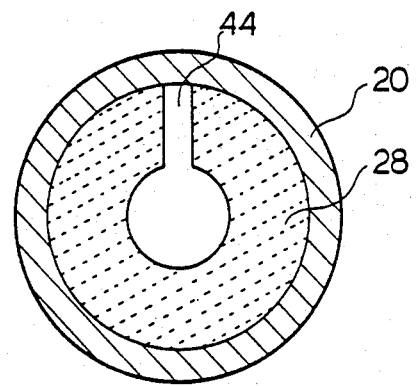
FIG. 3 is a view similar to FIG. 2 but showing another embodiment of the gas laser tube.

Turning to FIG. 3, there is shown a modification of the anode electrode 28. Namely, the shown anode electrode 28 has one slot 44 formed on the outer surface thereof, in place of the plurality of slots 42. The slot 44 extends from one end surface of the anode electrode 28 to the other end surface, similarly to the slots 42, but has a depth and a width, both of which are larger than those of the slots 42, respectively, so that the one slot 44 can have an expansion absorption capability to that given by all of the slots 42.

The invention has thus been shown and described with reference to the specific embodiments. However, it should be noted that the invention is in no way limited to the details of the illustrated structures but changes and modifications may be made within the scope of the appended claims.

I claim:

1. A gas laser tube which includes:
and elongated insulative envelope for containing a gaseous laser active medium therein, the envelope including a plurality of ceramic disc members and a plurality of ceramic cylindrical members which are alternately and coaxially arranged along a capillary axis of the gas laser tube, each of the disc members having a central through hole and a plurality of second through holes formed at the same angular intervals to surround the central through hole, the disc members and the cylindrical members being secured air-tightly to each other in such a manner that the central through holes of the respective disc members are aligned to form a straight discharge path, each second hole of each disc member functioning as a gas return path, and the envelope further including a pair of ceramic end caps respectively fixed to opposite ends of the series-secured disc members and cylndrical members, each of said end caps including a cylindrical end member secured at its one end to the corresponding one end of said opposite ends of the series-secured disc members and cylindrical members, an end plate secured to the other end of said cylindrical end member, and a tubular member extending outwardly from a center portion of said end plate, each of the end caps having a Brewster plate secured to a tip end of a corresponding tubular member and at an angle inclined to the laser capillary axis; and
an anode electrode and a cathode electrode provided in the corresponding end caps for causing an electric discharge therebetween within the envelope, the anode electrode being formed of a metallic disc having a center through hole in alignment with the straight discharge path formed by the aligned central through holes of the disc members for enabling a passage of a laser beam and for receiving said electric discharge from said cathode, said center through hole of said metallic disc anode electrode having a conical surface flared toward the aligned central through holes of the disc members,
wherein the improvement is that said metal disc anode electrode has an outer side surface in endless contact with an inner surface of said envelope, said metallic disc anode electrode having a plurality of slots formed in said outer side surface thereof at equal angular intervals to extend from one of opposite end surfaces of said metallic disc anode electrode to the other end surface, each of said slots having a depth which does not extend far enough across said end surfaces to reach said center through hole, each of said slots being inclined with respect to a radius of said metallic disc anode electrode, and said slots having said depth and a width sufficient to allow said metallic disc anode electrode to thermally expand in a circumferential direction of said metallic disc anode electrode without causing a substantial increase in the diameter of said metallic disc anode electrode, said expansion without increase of diameter being accomplished by means of a narrowing of said slots themselves so that said envelope is protected from being destroyed by the radial thermal expansion of said metallic disc anode electrode.

2. A gas laser tube comprising an elongated insulative envelope for containing a laser active medium therein, and an anode electrode and a cathode electrode provided in the elongated envelope for an electric discharge therebetween within the envelope, the anode electrode being formed of a metallic disc having a center through hole for allowing passage of a laser beam and for receiving the electric discharge from the cathode, wherein the improvement is that said metal disc anode electrode has an outer side surface in endless contact with an inner surface of said envelope, said metallic disc anode electrode having a plurality of slots formed in said outer side surface thereof at equal angular intervals to extend from one of opposite end surfaces of said metallic disc anode electrode to the other end surface, each of said slots being inclined with respect to a radius of said metallic disc anode electrode, each of said slots having a depth which does not extend far enough radially to reach said center through hole, and said slots having said depth and a width sufficient to allow said metallic disc anode electrode to thermally expand in a circumferential direction of said metallic disc anode electrode without a substantial increase in the diameter of said metallic disc anode electrode, said increase of diameter narrowing said slots themselves so that said envelope is protected from being destroyed by the radial thermal expansion of said metallic disc anode electrode.

3. A gas laser tube which includes:
an elongated insulative envelope for containing a gaseous laser active medium therein, the envelope including a plurality of ceramic disc members and a plurality of ceramic cylindrical members which are alternately and coaxially arranged along a capillary axis of the gas laser tube, each of the disc members having a central through hole and a plurality of second through holes formed at the same angular intervals to surround the central through hole, the disc members and the cylindrical members being secured air-tightly to each other in such a manner that the central through holes of the respective disc members are aligned to form a straight discharge path, and each second hole of each disc member functions as a gas return path, and the envelope further including a pair of ceramic end caps respectively fixed to opposite ends of the series-secured disc members and cylindrical members, each of the end caps having a Brewster plate located at its outer end; and an anode electrode and a cathode provided in the corresponding end caps for an electric discharge therebetween within said envelope, the anode electrode being formed of a metallic disc having a center through hole in alignment with the straight discharge path formed by the aligned central through holes of the disc members for allowing passage of a laser beam and for receiving said electric from said cathode, wherein the improvement is that said metal disc anode electrode has an outer side surface in endless contact with an inner surface of said envelope, said metallic disc anode electrode having a plurality of slots formed in said outer side surface thereof, said slots having a depth which does not extend far enough radially to reach said through hole, said slots being located at equal angular intervals to extend from one to the other end of opposite end surfaces of said metallic disc anode electrode whereby said slots formed in said outer side surface of said metallic disc anode electrode allow said metallic disc anode electrode to thermally expand in a circumferential direction of said metallic disc anode electrode without causing a substantial increase of the diameter of said metallic disc anode electrode, said expansion narrowing said slots themselves so that said envelope is protected from being destroyed by the radial thermal expansion of said metallic disc anode electrode 4. A gas laser tube as claimed in claim 3 wherein each of said slots is inclined with respect to a radius of said metallic disc anode electrode.

5. A gas laser tube as claimed in claim 4 wherein said slots have a depth and width that is sufficient to allow said metallic disc anode electrode to thermally expand in a circumferential direction of said metallic disc anode electrode without simultaneously having a substantial increase in the diameter of said metallic disc anode electrode, said expansion narrowing said slots themselves when the laser tube is brought from an non-operation condition into an operation condition.

6. A gas laser tube as claimed in claim 4 wherein each of said end caps includes a cylindrical end member secured at its one end to the corresponding one end of said opposite ends of the series-secured disc members and cylindrical members, an end plate secured to the other end of said cylindrical end member, and a tubular member extending outwardly from a center portion of said end plate, and wherein each Brewster plate is secured to a tip end of a corresponding tubular member at an angle which is inclined with respect to the laser capillary axis.

* * * * *